(12) United States Patent
Iwata

(10) Patent No.: US 11,186,798 B2
(45) Date of Patent: *Nov. 30, 2021

(54) THERMALLY CONDUCTIVE SILICONE GREASE COMPOSITION

(71) Applicant: SHIN-ETSU CHEMICAL CO., LTD., Tokyo (JP)

(72) Inventor: Mitsuhiro Iwata, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/762,548

(22) PCT Filed: Oct. 10, 2018

(86) PCT No.: PCT/JP2018/037726
§ 371 (c)(1),
(2) Date: May 8, 2020

(87) PCT Pub. No.: WO2019/093052
PCT Pub. Date: May 16, 2019

(65) Prior Publication Data
US 2020/0347315 A1 Nov. 5, 2020

(30) Foreign Application Priority Data

Nov. 9, 2017 (JP) .............................. JP2017-216118

(51) Int. Cl.
| | | |
|---|---|---|
| C10M 107/50 | (2006.01) | |
| C10M 125/04 | (2006.01) | |
| C10N 10/04 | (2006.01) | |
| C10N 10/06 | (2006.01) | |
| C10N 30/02 | (2006.01) | |

(52) U.S. Cl.
CPC ........ C10M 107/50 (2013.01); C10M 125/04 (2013.01); *C10M 2201/062* (2013.01); *C10M 2229/0415* (2013.01); *C10M 2229/0465* (2013.01); *C10N 2010/04* (2013.01); *C10N 2010/06* (2013.01); *C10N 2030/02* (2013.01)

(58) Field of Classification Search
CPC ........ C10M 107/50; C10M 2229/0415; C10M 2229/0465; C10M 2229/046; C10M 125/04; C10M 2201/062; C10N 2010/04; C10N 2010/06; C10N 2030/02
See application file for complete search history.

(56) References Cited

U.S. PATENT DOCUMENTS

| | | | |
|---|---|---|---|
| 3,885,984 A | 5/1975 | Wright | |
| 4,265,775 A | 5/1981 | Aakalu et al. | |
| 5,011,870 A | 4/1991 | Peterson | |
| 5,100,568 A * | 3/1992 | Takahashi | C10M 113/00 508/155 |
| 5,981,641 A | 11/1999 | Takahashi et al. | |
| 6,136,758 A | 10/2000 | Yamada et al. | |
| 6,174,841 B1 * | 1/2001 | Yamada | C10M 111/04 508/172 |
| 10,704,008 B2 * | 7/2020 | Ichiroku | C08L 63/00 |
| 10,870,786 B2 * | 12/2020 | Iwata | H01B 3/465 |
| 2002/0018885 A1 | 2/2002 | Takahashi et al. | |
| 2004/0254275 A1 | 12/2004 | Fukui et al. | |
| 2006/0135687 A1 | 6/2006 | Fukui | |
| 2007/0149834 A1 | 6/2007 | Endo et al. | |
| 2008/0269084 A1 * | 10/2008 | Matsumoto | H01L 23/3737 508/136 |
| 2010/0130673 A1 * | 5/2010 | Ito | C10M 169/02 524/588 |

(Continued)

FOREIGN PATENT DOCUMENTS

| | | | |
|---|---|---|---|
| JP | 52-33272 B2 | 8/1977 | |
| JP | 56-28264 A | 3/1981 | |

(Continued)

OTHER PUBLICATIONS

International Search Report (PCT/ISA/210) issued in PCT/JP2018/037726, dated Nov. 20, 2818.

(Continued)

*Primary Examiner* — Ellen M McAvoy
(74) *Attorney, Agent, or Firm* — Birch, Stewart, Kolasch & Birch, LLP

(57) ABSTRACT

Provided is a thermally conductive silicone grease composition that comprises: (A) an organopolysiloxane having a specific kinematic viscosity; (B) an organopolysiloxane having a specific kinematic viscosity; (C) a spherical aluminum oxide powder which has a specific average sphericity, a specific number of surface hydroxyl groups, and a specific average particle size, and for which the proportion of coarse particles in a laser diffraction type particle size distribution of 25 to 45 μm is within a specific range; and (D) a spherical and/or amorphous zinc oxide powder which has a specific average particle size, and for which the proportion of coarse particles in a laser diffraction type particle size distribution of 25 to 45 μm is within a specific range. The composition has a thermal conductivity measured by the hot disk method conforming to ISO 22007-2 of 2 W/m·K or more and less than 5.5 W/m·K, has a coefficient of viscosity measured by a spiral viscometer at a rotation frequency of 10 rpm of 5 to 800 Pa·s, has insulation properties and high thermal conductivity, and has excellent flowability, workability, and heat dissipation properties.

6 Claims, No Drawings

(56) References Cited

U.S. PATENT DOCUMENTS

| | | | |
|---|---|---|---|
| 2011/0039738 A1* | 2/2011 | Nakayoshi | C10M 169/02 508/150 |
| 2011/0248211 A1* | 10/2011 | Matsumoto | C08L 83/04 252/78.3 |
| 2012/0280169 A1* | 11/2012 | Kato | C10M 169/02 252/75 |
| 2013/0137613 A1* | 5/2013 | Kato | C10M 155/02 508/172 |
| 2015/0001439 A1* | 1/2015 | Tsuji | C10M 169/02 252/75 |
| 2016/0068732 A1* | 3/2016 | Kitazawa | C08L 83/04 252/75 |
| 2017/0081578 A1* | 3/2017 | Kato | H01L 23/42 |
| 2017/0283677 A1* | 10/2017 | Iwata | C08L 83/06 |
| 2018/0094207 A1 | 4/2018 | Ichiroku | |

FOREIGN PATENT DOCUMENTS

| | | |
|---|---|---|
| JP | 59-52195 B2 | 12/1984 |
| JP | 61-157587 A | 7/1986 |
| JP | 2-153995 A | 6/1990 |
| JP | 3-14873 A | 1/1991 |
| JP | 10-110179 A | 4/1998 |
| JP | 2000-63872 A | 2/2000 |
| JP | 2000-63873 A | 2/2000 |
| JP | 2002-30217 A | 1/2002 |
| JP | 2002-92693 A | 3/2002 |
| JP | 2004-262972 A | 9/2004 |
| JP | 2005-162975 A | 6/2005 |
| JP | 4933094 B2 | 5/2012 |
| JP | 5755977 B2 | 7/2015 |
| JP | 2016-79204 A | 5/2016 |
| JP | 2017-2179 A | 1/2017 |
| JP | 2017-75262 A | 4/2017 |
| WO | WO 2016/175001 A1 | 11/2016 |

OTHER PUBLICATIONS

Written Opinion (PCT/ISA/237) issued in PCT/JP2018/037726, dated Nov. 20, 2018.

* cited by examiner

THERMALLY CONDUCTIVE SILICONE GREASE COMPOSITION

TECHNICAL FIELD

This invention relates to a heat conductive silicone grease composition which is kept flowable even when it is heavily loaded with a heat conductive filler for imparting satisfactory electrical insulation and heat conduction, is easy to handle, and has improved durability and reliability under hot conditions or hot humid conditions.

BACKGROUND ART

During use, many electronic parts generate heat. For proper functioning of the electronic part, it is necessary to remove the heat from the part. In particular, advanced integrated circuit devices like CPU in personal computers produce increased amounts of heat due to the acceleration of operating speed. Thus thermal management is of significance.

For heat removal, a number of methods have been proposed. For electronic parts with much heat release, it is proposed to dispose a heat conductive material such as heat conductive grease composition or sheet between the electronic part and a member such as heat sink for efficiently releasing the heat from the electronic part (see Patent Document 1: JP-A S56-28264 and Patent Document 2: JP-A S61-157587). These compositions, however, are not satisfactory for heat dissipation where specification thickness largely differs.

Known heat conductive materials include heat dissipating grease compositions which are based on silicone fluid and loaded with zinc oxide or alumina powder (see Patent Document 3: JP-B S52-33272 and Patent Document 4: JP-B S59-52195). The compositions, however, are unsatisfactory in heat resistance at 200° C.

Some heat conductive materials use aluminum nitride powder for improving heat conduction. Patent Document 1, cited above, discloses a thixotropic heat conductive material comprising a liquid organosilicone carrier, silica fibers, and at least one member selected from dendritic zinc oxide, lamellar aluminum nitride, and lamellar boron nitride. Patent Document 5: JP-A H02-153995 discloses a silicone grease composition comprising a specific organopolysiloxane and spherical hexagonal aluminum nitride powder having a certain particle size range. Patent Document 6: JP-A H03-14873 discloses a heat conductive silicone grease composition using a combination of an aluminum nitride powder having a smaller particle size with an aluminum nitride powder having a larger particle size. Patent Document 7: JP-A H10-110179 discloses a heat conductive silicone grease composition using a combination of an aluminum nitride powder with a zinc oxide powder. Patent Document 8: JP-A 2000-063872 discloses a heat conductive grease composition using an aluminum nitride powder which has been surface treated with organosilane. All these compositions are unsatisfactory in the aspects of durability and reliability. Patent Document 9: JP-A 2002-030217 discloses a heat conductive silicone composition comprising a silicone resin, diamond, zinc oxide, and a dispersant, which is unsatisfactory in post-heating properties. It is noted that aluminum nitride has a thermal conductivity of 70 to 270 W/(m·K) and diamond has a higher thermal conductivity of 900 to 2,000 W/(m·K).

Metals have a high thermal conductivity and may be used where the electrical insulation of electronic parts is unnecessary. Patent Document 10: JP-A 2000-063873 discloses a heat conductive grease composition comprising a base fluid such as silicone fluid in admixture with a metallic aluminum powder. It is unsatisfactory because of the lack of insulation.

Also, all these heat conductive materials and heat conductive greases fail to comply with the increased heat generation of advanced IC devices such as CPU.

A material based on a silicone fluid filled with a heat conductive filler has a thermal conductivity which is little dependent on the thermal conductivity of the filler if the volume fraction of the filler is equal to or less than 0.6, as understood from the theoretical equation of Maxwell or Bruggeman. The thermal conductivity of the filler becomes significant only when the volume fraction of the filler is in excess of 0.6. This suggests that an increase in the thermal conductivity of heat conductive grease is first dependent on how to heavily load the grease with a heat conductive filler and if heavy loading is possible, how to select a filler having a higher thermal conductivity. However, the heavy loading interferes with the flow of heat conductive grease and detrimentally affects the efficiency of application like dispensing and screen printing, making the grease unacceptable on practical use. Further, a less flowing grease cannot conform to fine irregularities on the surface of electronic parts or heat sinks, resulting in an increase of contact thermal resistance.

For the purpose of obtaining a heat conductive material which is heavily loaded and smoothly flowing, Patent Document 11: JP-A 2004-262972 and Patent Document 12: JP-A 2005-162975 propose a heat conductive material comprising a heat conductive filler and an alkoxy group-containing organopolysiloxane for surface treating the filler for significantly increasing its dispersibility. However, since the treating agent can be altered by hydrolysis or the like under hot humid conditions, undesirably the performance of the heat conductive material is degraded.

Then, Patent Document 13: JP 4933094 proposes a heat conductive silicone grease composition which is effective for preventing the performance of heat conductive material from being degraded under hot humid conditions. The average particle size of the heat conductive filler is prescribed, but the shape, hydroxyl content and coarse particle content of the heat conductive filler are prescribed nowhere. The composition is still unsatisfactory in the application where insulation is required.

Patent Document 14: JP 5755977 discloses a highly heat conductive resin composition comprising a spherical aluminum oxide powder having a specific average sphericity, a specific hydroxyl content and an average particle size of 10 to 50 μm and an aluminum oxide powder having an average particle size of 0.3 to 1 μm wherein the aluminum oxides are blended in specific amounts and in a specific volume ratio. It is described that the spherical aluminum oxide powder has an average particle size of 50 μm at maximum, but the size range and content of coarse particles are prescribed nowhere. When the highly heat conductive resin composition is applied to a thin film of 50 μm or less, the problem of insufficient thermal resistance is left.

Also, Patent Document 15: JP-A 2002-092693 discloses a heat conductive silicone composition comprising an alumina powder having an average particle size of 0.1 to 100 μm, but the thermal conductivity and viscosity are prescribed nowhere. A mixture of a spherical alumina powder having an average particle size of 5 to 50 μm (exclusive of 5 μm) and a spherical or irregular alumina powder having an average particle size of 0.1 to 5 μm may be used. A heat conductive silicone composition in which the different aluminum oxides are blended in specific amounts and a specific weight ratio is disclosed. However, the average sphericity and hydroxyl content of spherical alumina with larger average particle size are prescribed nowhere, and the size range and content of coarse particles are prescribed nowhere. Like Patent Document 14, the problem of insufficient thermal resistance is left.

PRIOR ART DOCUMENTS

Patent Documents

Patent Document 1: JP-A S56-28264
Patent Document 2: JP-A S61-157587
Patent Document 3: JP-B S52-33272
Patent Document 4: JP-B S59-52195
Patent Document 5: JP-A H02-153995
Patent Document 6: JP-A H03-014873
Patent Document 7: JP-A H10-110179
Patent Document 8: JP-A 2000-063872
Patent Document 9: JP-A 2002-030217
Patent Document 10: JP-A 2000-063873
Patent Document 11: JP-A 2004-262972
Patent Document 12: JP-A 2005-162975
Patent Document 13: JP 4933094
Patent Document 14: JP 5755977
Patent Document 15: JP-A 2002-092693

SUMMARY OF INVENTION

Technical Problem

An object of the invention, which has been made in consideration of the above-mentioned problems, is to provide a heat conductive silicone grease composition which has good insulation, high heat conduction, ease of working due to the maintenance of smooth flow, reduced contact thermal resistance due to possible conformity to fine irregularities, and improved heat dissipation. Another object of the invention is to provide the heat conductive silicone grease composition having improved heat dissipation and working efficiency, while enhancing the durability thereof under hot or hot humid conditions and improving the reliability thereof upon mounting.

Solution to Problem

Making extensive investigations to attain the above object, the inventor has found that a heat conductive silicone grease composition as defined below has good insulation, heat conduction, smooth flow, and consequently, a good heat dissipation effect and that the composition is fully durable under hot or hot humid conditions. The invention is predicated on this finding.

The invention provides a heat conductive silicone grease composition as defined below.

A heat conductive silicone grease composition comprising:

(A) 5 to 99 parts by weight of an organopolysiloxane represented by the general formula (1):

[Chem. 1]

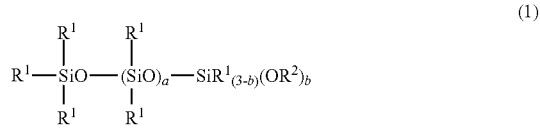

wherein $R^1$ is each independently a substituted or unsubstituted $C_1$-$C_{18}$ monovalent hydrocarbon group, $R^2$ is each independently an alkyl, alkoxyalkyl, alkenyl or acyl group, a is an integer of 5 to 100, and b is an integer of 1 to 3, and having a kinematic viscosity at 25° C. of 10 to 10,000 mm²/s, (B) 1 to 95 parts by weight of an organopolysiloxane represented by the average compositional formula (2):

$$R^3_c SiO_{(4-c)/2} \quad (2)$$

wherein $R^3$ is each independently a substituted or unsubstituted $C_1$-$C_{18}$ monovalent hydrocarbon group, and c is a number of 1.8 to 2.2, and having a kinematic viscosity at 25° C. of 10 to 100,000 mm²/s, the total amount of components (A) and (B) being 100 parts by weight, (C) a spherical aluminum oxide powder having an average sphericity of at least 0.8, a count of up to 30 surface hydroxyl groups/nm², and an average particle size of 3 to 20 μm, a content of coarse particles with a size of 25 to 45 μm in laser diffraction type particle size distribution being up to 0.2% by weight based on the overall powder (C), and (D) a spherical and/or irregular zinc oxide powder having an average particle size of 0.01 μm to less than 3 μm, a content of coarse particles with a size of 25 to 45 μm in laser diffraction type particle size distribution being up to 0.2% by weight based on the overall powder (D), components (C) and (D) being blended in a weight ratio of from 5:5 to 9.5:0.5, the total amount of components (C) and (D) being 65 to 83% by volume of the overall composition, the composition having a thermal conductivity of 2 W/m·K to less than 5.5 W/m·K as measured by the hot disk method according to ISO 22007-2, and a viscosity at 25° C. of 5 to 800 Pa·s as measured by a spiral viscometer at rotational speed 10 rpm.

The heat conductive silicone grease composition of [1] which after heat degradation at 200° C. for 100 hours, turns to an uncured grease state having a viscosity at 25° C. of up to 1,000 Pa·s as measured by a spiral viscometer at rotational speed 10 rpm.

The heat conductive silicone grease composition of [1] or [2], further comprising (E) a volatile solvent in which components (A) and (B) are dispersible or dissolvable, in an amount of up to 100 parts by weight per 100 parts by weight of components (A) and (B) combined.

The heat conductive silicone grease composition of any one of [1] to [3], further comprising (F) an alkoxysilane having the general formula (3):

$$R^4_d R^5_e Si(OR^6)_{4-d-e} \quad (3)$$

wherein $R^4$ is each independently a $C_9$-$C_{15}$ alkyl group, $R^5$ is each independently a substituted or unsubstituted $C_1$-$C_8$ monovalent hydrocarbon group, $R^6$ is each independently a $C_1$-$C_6$ alkyl group, d is an integer of 1 to 3, e is an integer of 0 to 2, d+e is an integer of 1 to 3, in an amount of 0.1 to 50 parts by weight per 100 parts by weight of components (A) and (B) combined, components (C) and (D) being surface treated with component (F).

The heat conductive silicone grease composition of any one of [1] to [4], which after standing in 130° C./85% RH atmosphere for 96 hours, has a thermal resistance at 25° C. of up to 15 mm$^2$·K/W as measured by the laser flash method.

The heat conductive silicone grease composition of any one of [1] to [5], having a volume resistivity of at least $1\times10^9$ Ω·cm.

Advantageous Effects of Invention

The heat conductive silicone grease composition of the invention is insulating, fully heat conductive, smoothly flowable, and efficiently workable. Since the silicone grease composition is also tightly adherent to heat-generating electronic parts and heat-dissipating parts, an assembly of the silicone grease composition sandwiched between a heat-generating electronic part and a heat-dissipating part ensures that the heat released from the heat-generating electronic part is efficiently transferred to the heat-dissipating part. In addition, the silicone grease composition is fully durable under hot or hot humid conditions. The silicone grease composition insures fully satisfactory reliability when used for the heat dissipation of general power supplies and electronic equipment, and the heat dissipation of LSIs, CPUs and other integrated circuit units built in electronic equipment such as personal computers and digital video disk drives. The silicone grease composition is effective for significantly improving the stability and lifetime of heat-generating electronic parts and electronic equipment using them.

DESCRIPTION OF EMBODIMENTS

Now the invention is described in detail.

The invention provides a heat conductive silicone grease composition comprising:

(A) an organopolysiloxane having the following formula (1), (B) an organopolysiloxane having the following formula (2), (C) a specific aluminum oxide powder, and (D) a specific zinc oxide powder, the composition having a specific thermal conductivity and viscosity.

[Component (A)]

Component (A) is an organopolysiloxane represented by the general formula (1):

[Chem. 2]

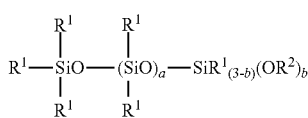

(1)

wherein $R^1$ is each independently a substituted or unsubstituted $C_1$-$C_{18}$ monovalent hydrocarbon group, $R^2$ is each independently an alkyl, alkoxyalkyl, alkenyl or acyl group, a is an integer of 5 to 100, and b is an integer of 1 to 3, and having a kinematic viscosity at 25° C. of 10 to 10,000 mm$^2$/s.

Even when a silicone grease composition is heavily loaded with heat conductive fillers as components (C) and (D) in order to form a highly heat conductive silicone grease composition, component (A) serves to keep the composition flowable and endow the composition with ease of handling. Component (A) may be used alone or in admixture of two or more.

$R^1$ is each independently a substituted or unsubstituted $C_1$-$C_{18}$, especially $C_1$-$C_{10}$ monovalent hydrocarbon group. Examples include straight, branched and cyclic alkyl, alkenyl, aryl, aralkyl and haloalkyl groups. Suitable straight alkyl groups include methyl, ethyl, propyl, hexyl, and octyl. Suitable branched alkyl groups include isopropyl, isobutyl, tert-butyl, and 2-ethylhexyl. Suitable cyclic alkyl groups include cyclopentyl and cyclohexyl. Suitable alkenyl groups include vinyl and allyl. Suitable aryl groups include phenyl and tolyl. Suitable aralkyl groups include 2-phenylethyl and 2-methyl-2-phenylethyl. Suitable haloalkyl groups include 3,3,3-trifluoropropyl, 2-(nonafluorobutyl)ethyl, and 2-(heptadecafluorooctyl)ethyl. $R^1$ is preferably methyl or phenyl.

$R^2$ is each independently a $C_1$-$C_{18}$, especially $C_1$-$C_{10}$ alkyl, alkoxyalkyl, alkenyl or acyl group. Suitable alkyl groups include straight, branched and cyclic alkyl groups as exemplified above for $R^1$. Suitable alkoxyalkyl groups include methoxyethyl and methoxypropyl. Suitable alkenyl groups include such groups as exemplified above for $R^1$. Suitable acyl groups include acetyl and octanoyl. $R^2$ is preferably an alkyl group, especially methyl or ethyl.

The subscript "a" is an integer of 5 to 100, preferably 5 to 50, more preferably 5 to 30, and b is an integer of 1 to 3, preferably 3.

Component (A) should have a kinematic viscosity at 25° C. of 10 to 10,000 mm$^2$/s, preferably 10 to 5,000 mm$^2$/s. If the kinematic viscosity is lower than 10 mm$^2$/s, the resulting silicone grease composition yields oil bleeding. If the kinematic viscosity is higher than 10,000 mm$^2$/s, the resulting silicone grease composition becomes less flowable. As used herein, the kinematic viscosity of component (A) is measured at 25° C. by an Ostwald viscometer.

Component (A) is added to the inventive composition in an amount of 5 to 99 parts by weight, preferably 15 to 85 parts by weight, with the proviso that the total of components (A) and (B) is 100 parts by weight. As long as the amount of component (A) added is in the range, the inventive composition maintains good flow and working efficiency and it is easy that the composition is heavily loaded with heat conductive fillers as components (C) and (D) to be described later.

It is noted that if component (A) is less than 5 parts by weight, heavy loading of heat conductive fillers as components (C) and (D) is inhibited. In excess of 99 parts by weight, component (A) bleeds out with a lapse of time.

Preferred examples of component (A) are given below.

[Chem. 3]

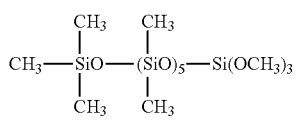

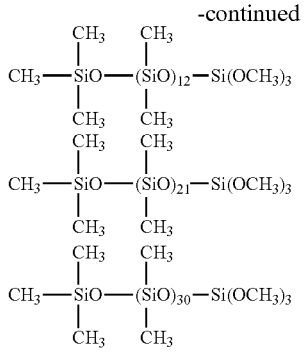

[Component (B)]

To the inventive composition is added component (B), which is an organopolysiloxane represented by the average compositional formula (2):

$$R^3{}_c SiO_{(4-c)/2} \quad (2)$$

wherein $R^3$ is each independently a substituted or unsubstituted $C_1$-$C_{18}$ monovalent hydrocarbon group, and c is a number of 1.8 to 2.2, and having a kinematic viscosity at 25° C. of 10 to 100,000 mm$^2$/s.

Component (B) is used for the purpose of imparting the functions of viscosity adjusting agent and tackifier to the inventive silicone grease composition, while it may be used alone or in admixture of two or more.

$R^3$ is each independently a substituted or unsubstituted $C_1$-$C_{18}$, especially $C_1$-$C_{10}$ monovalent hydrocarbon group. Examples of $R^3$ include alkyl groups such as methyl, ethyl, propyl, hexyl, octyl, decyl, dodecyl, tetradecyl, hexadecyl, and octadecyl, cycloalkyl groups such as cyclopentyl and cyclohexyl, alkenyl groups such as vinyl and allyl, aryl groups such as phenyl and tolyl, aralkyl groups such as 2-phenylethyl and 2-methyl-2-phenylethyl, and halogenated hydrocarbon groups such as 3,3,3-trifluoropropyl, 2-(perfluorobutyl)ethyl, 2-(perfluorooctyl)ethyl, and p-chlorophenyl. Inter alia, methyl, phenyl and $C_6$-$C_{18}$ alkyl groups are preferred, with methyl and phenyl being more preferred.

As viewed from the consistency required for the inventive composition to function as a silicone grease composition, c is a number of 1.8 to 2.2, preferably 1.9 to 2.1.

Component (B) typically has a kinematic viscosity at 25° C. of 10 to 100,000 mm$^2$/s, preferably 10 to 10,000 mm$^2$/s. If the kinematic viscosity is lower than 10 mm$^2$/s, the resulting silicone grease composition yields liquid separation and oil bleeding. If the kinematic viscosity is higher than 100,000 mm$^2$/s, the resulting silicone grease composition becomes less flowable and inefficient to work. Notably, the kinematic viscosity of component (B) is also measured at 25° C. by an Ostwald viscometer.

Examples of component (B) are given below.

[Chem. 4]

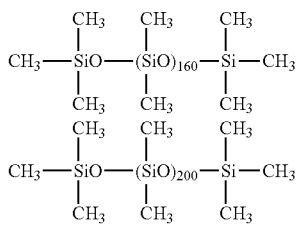
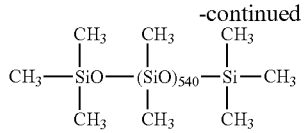

Component (B) is added to the inventive composition in an amount of 1 to 95 parts by weight, preferably 15 to 85 parts by weight, with the proviso that the total amount of components (A) and (B) is 100 parts by weight. As long as the amount of component (B) added is in the range, the inventive composition maintains good flow and working efficiency and it is easy that the composition is heavily loaded with heat conductive fillers as components (C) and (D) to be described later.

It is noted that if component (B) is less than 1 part by weight, component (A) bleeds out with a lapse of time. In excess of 95 parts by weight, heavy loading of heat conductive fillers as components (C) and (D) is inhibited.

[Component (C)]

Component (C) used herein is a spherical aluminum oxide powder having an average sphericity of at least 0.8, a count of up to 30 surface hydroxyl groups/nm$^2$, and an average particle size of 3 to 20 μm, a content of coarse particles with a size of 25 to 45 μm in laser diffraction type particle size distribution being up to 0.2% by weight based on the overall powder (C).

Component (C) should have an average sphericity of at least 0.8, preferably at least 0.9. If the average sphericity of component (C) is less than 0.8, outstandingly more particles contact with each other to make the sheet surface more irregular (more raised and recessed portions), resulting in an increased interfacial thermal resistance or degraded thermal conductivity.

As used herein, the average sphericity of component (C) may be measured as follows by taking a particle image under a scanning electron microscope, and capturing the image in an image analyzer, for example, JSM-7500F by JEOL Ltd. Specifically, from the image, the projection area (X) and peripheral length (Z) of each particle are measured. Provided that (Y) is the area of a perfect circle corresponding to the peripheral length (Z), the sphericity of that particle is given by X/Y. Assume a perfect circle having the same peripheral length as the peripheral length (Z) of a sample particle. Since $Z=2\pi r$ and $Y=\pi r^2$ wherein r is a radius, then $Y=\pi \times (Z/2\pi)^2$. The sphericity of each particle is computed as sphericity=X/Y=X×4π/Z$^2$. In this way, the sphericities of arbitrary 100 particles are determined. An average thereof gives an average sphericity. Notably, an average sphericity of at least 0.8 means that aluminum oxide powder particles as component (C) are of spherical shape.

The count of surface hydroxyl groups is preferably up to 30 groups/nm$^2$, more preferably up to 25 groups/nm$^2$, even more preferably up to 20 groups/nm$^2$. If the count of surface hydroxyl groups exceeds 30 groups/nm$^2$, the composition is difficultly loaded with the filler and degraded in thermal conductivity. As to the lower limit, the count of surface hydroxyl groups is typically at least 10 groups/nm$^2$.

The surface hydroxyl group concentration of component (C) may be measured by the Karl Fischer coulometric titration method, for example, by a moisture meter CA-100 from Mitsubishi Chemical Analytech Co., Ltd. Specifically, a sample (0.3 to 1.0 g) is fed into a moisture vaporizer, dry argon gas is fed as carrier gas, and the sample is heated by an electric heater. The amount of water generated over the temperature range from 200° C. to 900° C. in the Karl Fischer coulometric titration method is defined as the surface hydroxyl group amount. The surface hydroxyl group concentration is computed from the water amount thus measured and specific surface area.

Component (C) should have an average particle size on volume basis of 3 to 20 μm, preferably 3 to 10 μm. If the average particle size is less than 3 μm, thermal conductivity is degraded due to less contact between particles and increased contact thermal resistance between particles. If the average particle size exceeds 20 μm, the silicone grease composition becomes more irregular on its surface (more raised and recessed portions), resulting in an increased interfacial thermal resistance or degraded thermal conductivity.

Both the desired thermal resistance and high heat conduction are met as long as a content of coarse particles with a size of 25 to 45 μm in laser diffraction type particle size distribution is up to 0.2% by weight based on the overall powder (C). If a content of coarse particles of 25 to 45 μm is more than 0.2% by weight based on the overall powder (C), the inventive silicone grease composition fails to take a thickness of 25 to 45 μm and to reach the desired thermal resistance. The content of coarse particles of 25 to 45 μm is preferably up to 0.1% by weight, more preferably 0% by weight.

The average particle size of component (C) may be measured, for example, using a laser diffraction type particle size distribution analyzer SALD-2300 by Shimadzu Corp. A test sample is obtained by adding 50 cc of deionized water and 5 g of heat conductive powder to a glass beaker, agitating the contents with a spatula, and conducting dispersion treatment on an ultrasonic cleaner for 10 minutes. Using a pipette, the solution of heat conductive material powder as dispersed is added one by one droplet to the sampler section of the analyzer. A standby time is taken until absorbance stabilizes to a measurable level. Measurement is made at the time when absorbance becomes stable. In the laser diffraction type particle size distribution analyzer, a particle size distribution is computed from the data of light intensity distribution of diffraction/scattering light by particles as detected by the sensor. The average particle size is determined by multiplying the particle diameter measured by the relative particle quantity (differential %) and dividing by the total (100 wt %) of relative particle quantity. It is noted that the average particle size is an average diameter of particles. Also the content of coarse particles of 25 to 45 μm in component (C) is readily confirmed from the overall particle size distribution.

The crystal structure of component (C) may be either mono- or polycrystalline, the crystal phase thereof is desirably alpha-phase in view of high thermal conductivity, and the specific gravity thereof is desirably at least 3.7. If the specific gravity is less than 3.7, the proportion of vacancy and low crystalline phase within particles becomes so high as to make it difficult to increase the thermal conductivity. The particle size of component (C) may be adjusted by classification and mixing operations.

Provided that component (C) is a spherical aluminum oxide powder having an average sphericity of at least 0.8, a count of up to 30 surface hydroxyl groups/nm$^2$, and an average particle size of 3 to 20 μm, a content of coarse particles with a size of 25 to 45 μm in laser diffraction type particle size distribution being up to 0.2% by weight based on the overall powder, component (C) may be used alone or as a mixture of two or more having different average particle sizes as long as the benefits of the invention are not compromised.

[Component (D)]

Component (D) is a spherical and/or irregular zinc oxide powder having an average particle size on volume basis of 0.01 μm to less than 3 μm, a content of coarse particles with a size of 25 to 45 μm in laser diffraction type particle size distribution being up to 0.2% by weight based on the overall powder.

The zinc oxide powder or component (D) functions as a heat conductive filler in the heat conductive silicone grease composition. Component (D) may be used alone or as a mixture of two or more.

Component (D) should have an average particle size of 0.01 μm to less than 3 μm, preferably 0.01 to 2 μm, more preferably 0.01 to 1 μm, even more preferably 0.01 to 0.5 μm. As long as the average particle size is in the range, component (D) is likely to have so high a bulk density and so small a specific surface area as to facilitate heavy loading of the silicone grease composition with component (D). If the average particle size is less than 0.01 μm, the composition is difficultly loaded with such powder and has an extremely high viscosity. If the average particle size is equal to or more than 3 μm, oil separation readily takes place.

Both the desired thermal resistance and high thermal conductivity are met as long as the content of coarse particles with a size of 25 to 45 μm in laser diffraction type particle size distribution is up to 0.2% by weight based on the overall powder (D). If the content of coarse particles of 25 to 45 μm is more than 0.2% by weight based on the overall powder (D), the inventive silicone grease composition fails to take a thickness of 25 to 45 μm and to reach the desired thermal resistance. The content of coarse particles of 25 to 45 μm is preferably up to 0.1% by weight, more preferably 0% by weight.

Notably, the methods of measuring the average particle size of component (D) and the content of coarse particles in component (D) are the same as component (C).

Component (D) may be of spherical or irregular shape. Component (D) other than spherical shape is of irregular shape. The irregular shape is rod, needle or disk shape, for example, and is not particularly limited as long as the benefits of the invention are not compromised. Component (D) may consist of spherical shape particles or irregular shape particles, or a combination thereof. Component (D) of spherical shape means that the average sphericity is preferably at least 0.8, more preferably at least 0.9 as measured in conjunction with component (C).

Component (D) should preferably have a purity of at least 99.5%, and more preferably at least 99.8% from the standpoint of impurities such as Pb and Cd. Notably the purity is measured by the atomic absorption spectrometry according to JIS K 1410.

In the heat conductive silicone grease composition, component (C), i.e., spherical aluminum oxide powder having an average particle size of 3 to 20 μm, a content of coarse particles with a size of 25 to 45 μm in laser diffraction type particle size distribution being up to 0.2% by weight based on the overall powder (C), and component (D), i.e., spherical or irregular zinc oxide powder having an average particle size of 0.01 μm to less than 3 μm, a content of coarse particles with a size of 25 to 45 μm in laser diffraction type particle size distribution being up to 0.2% by weight based on the overall powder (D), are blended in a weight ratio of from 5:5 to 9.5:0.5, preferably from 6:4 to 9:1. If component (C) is less than 5 in weight ratio, loading of this filler is aggravated. If component (C) is more than 9.5 in weight ratio, dense loading of this filler is difficult, leading to a loss of heat conduction.

In the heat conductive silicone grease composition, the total content of components (C) and (D) is 65 to 83% by volume, desirably 70 to 83% by volume, more desirably 75 to 83% by volume of the overall composition. The silicone grease composition loaded with heat conductive fillers in a total content of less than 65% by volume is less heat conductive. It is difficult to load the silicone grease composition with heat conductive fillers in a total content in excess of 83% by volume.

[Component (E)]

To the inventive composition, a volatile solvent in which components (A) and (B) are dispersible or dissolvable may be added as component (E). In an embodiment wherein the composition contains the organopolysiloxanes as components (A) and (B) and a silane compound as component (F) to be described later, the volatile solvent in which component (F) is also dispersible or dissolvable is preferred. Any solvent may be used as component (E) as long as components (A) and (B) and optionally (F) are dispersible or dissolvable therein. Component (E) may be used alone or in admixture.

Since thermal conductivity is basically correlated to the percent loading of heat conductive filler, the thermal conductivity of a heat conductive silicone grease composition increases as the amount of heat conductive filler added is increased. However, as a matter of course, as the amount of heat conductive filler added is increased, there is a likelihood that the viscosity of a heat conductive silicone grease composition itself increases, and the dilatancy of the composition under applied shear stress becomes stronger. Especially in the case of screen printing, if a heat conductive silicone grease composition develops a strong dilatancy upon squeezing, then the flow of the composition is temporarily intensely restrained so that the composition cannot pass through a screen mask and screen mesh, resulting in tremendous degradation of printability. As discussed above, it is difficult in the prior art to apply a heat conductive silicone grease composition heavily loaded with a heat conductive filler, to heat sinks or the like easily, uniformly and thinly by screen printing. The heat conductive silicone grease composition of the invention which is heavily loaded with heat conductive fillers as components (C) and (D) and which contains a volatile solvent as component (E) tends to experience a sharp drop of viscosity and develop little dilatancy, so that the composition is improved in applicability, that is, easily applicable to heat sinks or the like by screen printing. After application, component (E) is readily volatilized at room temperature or by positive heating. Accordingly, in the practice of the invention, the heat conductive silicone grease composition which is heavily loaded with heat conductive fillers can be applied to heat sinks or the like easily, uniformly and thinly by screen printing.

Component (E) preferably has a boiling point in the range of 80 to 260° C. This range of boiling point is effective for preventing component (E) from quickly volatilizing off the composition during application thereof, thus suppressing the composition from building up its viscosity and keeping the composition effectively applicable. Since none or little of component (E) is left in the composition after it has been applied, heat dissipating properties are improved.

Examples of component (E) include toluene, xylene, acetone, methyl ethyl ketone, cyclohexanone, n-hexane, n-heptane, butanol, isopropanol (IPA), and isoparaffin base solvents. From the standpoints of safety, health and efficient working, isoparaffin base solvents are preferred, with isoparaffin base solvents having a boiling point of 80 to 260° C. being more preferred.

When component (E) is added to the inventive composition, the amount of component (E) added is preferably up to 100 parts by weight, more preferably up to 75 parts by weight per 100 parts by weight of components (A) and (B) combined. An amount of component (E) in the range is effective for preventing components (C) and (D) from fast settling down, and so the composition is improved in shelf stability. As to the lower limit, the amount of component (E) added is preferably at least 1 part by weight, more preferably at least 5 parts by weight, as viewed from the standpoint of applicability of the silicone grease composition.

[Component (F)]

The silicone grease composition of the invention may further comprise (F) an alkoxysilane. Component (F) is an alkoxysilane having the general formula (3):

$$R^4_d R^5_e Si(OR^6)_{4-d-e} \tag{3}$$

wherein $R^4$ is each independently a $C_9$-$C_{15}$ alkyl group, $R^5$ is each independently a substituted or unsubstituted $C_1$-$C_8$ monovalent hydrocarbon group, $R^6$ is each independently a $C_1$-$C_6$ alkyl group, d is an integer of 1 to 3, e is an integer of 0 to 2, and d+e is an integer of 1 to 3.

Component (F) is a wetter and an additive for preventing component (A) from altering under hot humid conditions. When heat conductive fillers as components (C) and (D) are surface treated with component (F), the wettability of components (C) and (D) with component (A) is improved. As a result, component (F) assists in heavy loading of components (C) and (D). Also, component (F), when used along with component (A), acts to control contact of component (A) with water vapor under hot humid conditions. As a result, component (F) prevents the silicone grease composition from degrading its performance due to the alteration of component (A) caused by hydrolysis under hot humid conditions. Component (F) may be used alone or in admixture of two or more.

$R^4$ is each independently a $C_9$-$C_{15}$ alkyl group. Examples thereof include nonyl, decyl, dodecyl, tetradecyl, and pentadecyl. If the carbon count is less than 9, the wettability with the heat conductive fillers as components (C) and (D) may be insufficient. If the carbon count is more than 15, component (F) is likely to solidify at normal temperature and inconvenient to handle, and the resulting composition is likely to lose heat resistance and flame retardance.

$R^5$ is each independently a substituted or unsubstituted $C_1$-$C_8$ monovalent hydrocarbon group which may be saturated or unsaturated. Examples thereof include alkyl groups such as methyl, ethyl, propyl, hexyl and octyl, cycloalkyl groups such as cyclopentyl and cyclohexyl, alkenyl groups such as vinyl and allyl, aryl groups such as phenyl and tolyl, aralkyl groups such as 2-phenylethyl and 2-methyl-2-phenylethyl, and halogenated hydrocarbon groups such as 3,3,3-trifluoropropyl, 2-(nonafluorobutyl)ethyl, and p-chlorophenyl. Inter alia, methyl and ethyl are preferred.

$R^6$ is each independently a $C_1$-$C_6$ alkyl group. Examples thereof include methyl, ethyl, propyl, butyl, pentyl and hexyl, with methyl and ethyl being preferred.

The subscript d is typically an integer of 1 to 3, preferably 1, e is an integer of 0 to 2, and d+e is an integer of 1 to 3.

Examples of component (F) include
$C_{10}H_{21}Si(OCH_3)_3$,
$C_{10}H_{21}Si(OC_2H_5)_3$,
$C_{12}H_{25}Si(OCH_3)_3$,
$C_{12}H_{25}Si(OC_2H_5)_3$, $C_{10}H_{21}Si(CH_3)(OCH_3)_2$,
$C_{10}H_{21}Si(C_6H_5)(OCH_3)_2$,
$C_{10}H_{21}Si(CH_3)(OC_2H_5)_2$,
$C_{10}H_{21}Si(CH=CH_2)(OCH_3)_2$, and
$C_{10}H_{21}Si(CH_2CH_2CF_3)(OCH_3)_2$.

When used, the amount of component (F) added is typically 0.1 to 50 parts by weight, preferably 1 to 20 parts by weight per 100 parts by weight of components (A) and (B) combined. As long as the amount is in the range, the wetter effect and temperature/humidity resisting effect become greater in proportion to the addition amount, leading to an economical benefit. Since component (F) is somewhat volatile, there can arise a phenomenon that when the heat conductive silicone grease composition comprising component (F) is allowed to stand in an open system, component (F) evaporates off and the composition becomes gradually harder. The phenomenon is avoidable as long as the amount is in the range.

For the surface treatment of components (C) and (D) with component (F), there may be utilized any of spraying through a fluid nozzle, agitation with shearing force, dry methods on a ball mill, mixer and the like, and wet methods using aqueous or organic solvents. It is important that the agitation method be performed to such an extent that the spherical aluminum oxide powder may not be broken. In the dry methods, the temperature within the system or the drying temperature after treatment is determined as appropriate depending on the type of surface treating agent as long as the volatilization and decomposition of the surface treating agent are avoided. The temperature is typically 80 to 180° C. Use may also be made of a procedure involving the steps of heating and mixing components (C) and (D) along with components (A) and (B), cooling the mixture, adding component (F) or components (E) and (F) thereto, and mixing the contents.

[Other Additives]

Any additives and fillers which are commonly used may be further added as optional components to the heat conductive silicone grease composition as long as the benefits of the invention are not compromised. Examples include fluorine-modified silicone surfactants, colorants such as carbon black, titanium dioxide and red iron oxide, flame retardants such as platinum catalysts, metal oxides such as iron oxide, titanium oxide and cerium oxide, and metal hydroxides. There may also be added anti-settling agents for the heat conductive fillers at high temperature, for example, finely divided silica such as precipitated silica or fired silica, and thixotropic agents.

[Preparation of Composition]

The heat conductive silicone grease composition is prepared by mixing the foregoing components on a mixer such as dough mixer or kneader, gate mixer, or planetary mixer. The composition thus obtained achieves a marked improvement in thermal conductivity and offers satisfactory workability, durability and reliability.

[Thermal Conductivity]

The heat conductive silicone grease composition should have a thermal conductivity at 25° C. of 2 W/m·K to less than 5.5 W/m·K, specifically 2.0 W/m·K to less than 5.5 W/m·K, preferably 3.0 W/m·K to less than 5.5 W/m·K, as measured by the hot disk method according to ISO 22007-2. If the thermal conductivity is too low, the desired thermal properties of a heat-generating electronic part are aggravated. If the thermal conductivity is too high, the composition becomes difficult to apply. For the measurement of thermal conductivity of the composition, for example, a meter TPS 2500S by Kyoto Electronics Mfg. Co., Ltd. may be used.

[Viscosity]

The heat conductive silicone grease composition should have a viscosity at 25° C. of 5 to 800 Pa·s, preferably 5 to 500 Pa·s, more preferably 5 to 400 Pa·s as measured by a spiral viscometer at rotational speed 10 rpm. As long as the viscosity falls in the range, the composition is so flowable that it may be improved in working, specifically dispensing or screen printing, and easy to thinly coat on substrates. For the viscosity measurement on the inventive composition, for example, a meter Type PC-10AA by Malcom Co., Ltd. may be used.

Also after the silicone grease composition is thermally degraded by drying at 200° C. for 100 hours, it preferably has a viscosity at 25° C. of up to 1,000 Pa·s, more preferably up to 700 Pa·s, even more preferably up to 500 Pa·s as similarly measured. The composition in such uncured grease state insures reliability to heat-generating electronic parts.

[Thermal Resistance]

The heat conductive silicone grease composition preferably has a thermal resistance at 25° C. of up to 12 mm²·K/W, more preferably up to 10 mm²·K/W as measured by the laser flash method.

Also after the heat conductive silicone grease composition is allowed to stand in 130° C./85% RH atmosphere for 96 hours, it preferably has a thermal resistance at 25° C. of up to 15 mm²·K/W, more preferably up to 12 mm²·K/W as measured by the laser flash method. A thermal resistance within the range insures that even when the composition is applied to a heat-generating part having a great heat release, the composition is effective for dissipating the heat from the heat-generating part to the outside. Notably, the measurement of thermal resistance by the laser flash method may be performed according to ASTM E 1461.

[Volume Resistivity]

The heat conductive silicone grease composition should preferably have a volume resistivity of at least $1 \times 10^9$ Ω·cm, more preferably at least $1 \times 10^{10}$ Ω·cm, as measured according to JIS K 6911. Within the range, the composition remains insulating.

[Application of Composition]

The heat conductive silicone grease composition is applied or coated to heat generators or heat dissipators. Suitable heat generators are general power supplies; electronic devices such as supply power transistors, power modules, thermistors, thermo-couples, and temperature sensors; and heat-generating electronic parts including integrated circuit parts such as LSIs and CPUs. Suitable heat dissipators include heat-dissipating parts such as heat spreaders and heat sinks; heat pipes; and radiating fins. The application may be performed by screen printing, for example. In the screen printing, a metal mask or screen mesh may be used. When the composition is applied so as to intervene between a heat generator and a heat dissipator, the heat is efficiently conducted from the heat generator to the heat dissipator, that is, the heat is effectively removed from the heat generator.

EXAMPLES

Examples and Comparative Examples are given below for further illustrating the invention although the invention is not limited thereto.

Examples 1 to 10 and Comparative Examples 1 to 10

The following components were furnished before compositions within the range of the invention were prepared.

(A) Organopolysiloxane having silicon-bonded alkoxy group

A-1: organopolysiloxane of the formula below having a kinematic viscosity of 30 mm²/s

[Chem. 5]

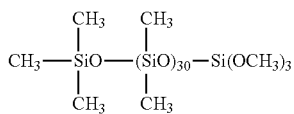

(B) Organopolysiloxane

B-1: organopolysiloxane of the formula below having a kinematic viscosity of 500 mm²/s

[Chem. 6]

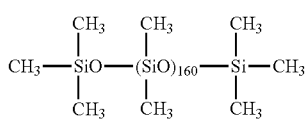

(C) Spherical aluminum oxide powder

TABLE 1

| Designation | Average particle size (μm) | Average sphericity | Hydroxyl content (count/nm²) | Content of coarse particles (wt %) |
|---|---|---|---|---|
| C-1 | 3.2 | 0.90 | 25 | 0 |
| C-2 | 8.7 | 0.90 | 20 | 0 |
| C-3 | 19 | 0.85 | 14 | 0.1 |
| C-4 (comparison) | 1.6 | 0.90 | 27 | 0 |
| C-5 (comparison) | 23 | 0.85 | 18 | 0.5 |
| C-6 (comparison) | 15 | 0.70 | 20 | 0 |
| C-7 (comparison) | 11 | 0.90 | 40 | 0 |

It is noted that the average particle size was computed from the overall particle size distribution obtained from the laser diffraction particle size distribution. The content of coarse particles is a percentage of coarse particles of 25-45 μm relative to the overall particle size distribution obtained from the laser diffraction particle size distribution.

(D) Irregular zinc oxide powder (average particle size 0.27 μm, content of coarse particles 0 wt % as undersize fraction through sieve opening 45 μm according to JIS Z 8801-1)

It is noted that the average particle size was computed from the overall particle size distribution obtained from the laser diffraction particle size distribution. The percentage of coarse particles of 25-45 μm relative to the overall particle size distribution obtained from the laser diffraction particle size distribution is 0 wt %.

(E) Volatile solvent in which components A-1, B-1 and F-1 are dispersible or dissolvable E-1: Isosol® 400 (trade name, isoparaffin solvent, b.p. 210-254° C., JXTG Energy Co., Ltd.)

(F) Alkoxysilane

F-1: alkoxysilane of the formula:

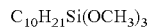

[Preparation method]

Compositions of Examples 1 to 10 and Comparative Examples 1 to 10 were prepared by mixing components (A) to (D) and optionally components (E) and (F) as follows. In a 5-L planetary mixer (Inoue Mfg. Inc.), components (A) to (D) were metered in accordance with the compositional ratio (pbw) shown in Tables 2 and 3, and mixed under conditions: 150C, reduced pressure below 30 mmHg, and 1 hour. With stirring, the mixture was cooled to normal temperature. When components (E) and (F) were added, the amounts shown in Tables 2 and 3 of components (E) and (F) were added to the cool mixture and mixed until uniform.

[Tests]

The compositions thus obtained were measured by the following test methods, with the results shown in Tables 2 and 3.

[Viscosity Measurement]

After the composition was allowed to stand in a thermostat chamber at 25° C. for 24 hours, its viscosity was measured by a viscometer (spiral viscometer PC-10AA, Malcom Co., Ltd.) at rotational speed 10 rpm.

[Viscosity Measurement after Thermal Degradation]

The composition was thermally degraded in a dryer at 200° C. for 100 hours and then allowed to stand in a thermostat chamber at 25° C. for 24 hours, after which its viscosity was similarly measured.

[Thermal Conductivity Measurement]

Two samples of each composition were wrapped with kitchen wrap film so that no bubbles were entrained. The sample was inserted into the sensor of a thermal conductivity meter (trade name TPS-2500S, Kyoto Electronics Mfg. Co., Ltd.) where a thermal conductivity was measured at 25° C.

[Preparation of Test Piece for Measurement of Thickness and Thermal Resistance]

The composition of 75 μm thick was sandwiched between a pair of aluminum disks of diameter 12.6 mm and thickness 1 mm and compressed under a pressure of 0.15 MPa at 25° C. for 60 minutes, obtaining a test piece.

[Thickness Measurement]

The thickness of the test piece was measured by a micrometer (Mitutoyo Corp.). The thickness of the composition was computed by subtracting the pre-measured thickness of two aluminum disks from the thickness of the test piece.

[Thermal Resistance Measurement]

Using the test piece, the thermal resistance (unit: mm²·K/W) of the composition was measured at 25° C. by a thermal resistance meter (xenon flash analyzer: LFA447 NanoFlash, Netzsch Group) according to the laser flash method.

[Thermal Resistance Measurement After Hot Humid Holding]

The test piece after the measurement of thermal resistance was allowed to stand in 130° C./85% RH atmosphere for 96 hours, after which the thermal resistance (unit: mm²·K/W) of the composition was measured again at 25° C. by the same thermal resistance meter.

[Volume Resistivity Measurement]

A specimen of 1.0 mm thick was prepared from the composition for the measurement by the double ring electrode method according to JIS K 6911. A voltage of 500 V between the electrodes was applied, and a volume resistivity was measured after 1 minute.

TABLE 2

| | Amount (pbw) | | | | | | | | | |
|---|---|---|---|---|---|---|---|---|---|---|
| | Example | | | | | | | | | |
| | 1 | 2 | 3 | 4 | 5 | 6 | 7 | 8 | 9 | 10 |
| A-1 | 40 | 40 | 40 | 40 | 40 | 40 | 80 | 30 | 40 | 40 |
| B-1 | 60 | 60 | 60 | 60 | 60 | 60 | 20 | 70 | 60 | 60 |
| C-1 | 1,120 | | | | | | | | | |
| C-2 | | 1,120 | | 1,260 | 1,120 | 1,120 | 1,120 | 1,120 | 990 | 1,350 |
| C-3 | | | 1,120 | | | | | | | |
| D-1 | 480 | 480 | 480 | 540 | 480 | 480 | 480 | 480 | 660 | 150 |
| E-1 | | | | | 15 | | 15 | | | |
| F-1 | | | | | | 1 | | | | |
| Filler volume (vol %) | 78.5 | 78.5 | 78.5 | 80.5 | 75.5 | 75.3 | 78.5 | 78.5 | 78.5 | 78.5 |
| C/D weight ratio | 7/3 | 7/3 | 7/3 | 7/3 | 7/3 | 7/3 | 7/3 | 7/3 | 6/4 | 9/1 |
| Viscosity (Pa · s) | 312 | 198 | 115 | 352 | 82 | 77 | 114 | 482 | 443 | 548 |
| Viscosity (Pa · s) after 200° C./100 h drying | 462 | 301 | 262 | 415 | 312 | 296 | 298 | 552 | 581 | 679 |
| Thermal conductivity (W/m · K) | 4.0 | 4.2 | 4.5 | 5.0 | 3.4 | 3.4 | 4.2 | 4.2 | 4.2 | 4.0 |
| Volume resistivity (Ω · cm) | $2.9 \times 10^{10}$ | $1.9 \times 10^{10}$ | $3.2 \times 10^{10}$ | $1.7 \times 10^{10}$ | $2.1 \times 10^{10}$ | $2.1 \times 10^{10}$ | $1.5 \times 10^{10}$ | $2.6 \times 10^{10}$ | $1.9 \times 10^{10}$ | $3.8 \times 10^{10}$ |
| Thickness (μm) | 25 | 32 | 41 | 33 | 31 | 32 | 32 | 32 | 32 | 33 |
| Thermal resistance (mm² · K/W) | 6.3 | 7.9 | 9.1 | 6.6 | 8.3 | 8.3 | 7.8 | 7.6 | 7.9 | 9.4 |
| Thermal resistance (mm² · K/W) after hot humid holding | 7.9 | 8.5 | 10.3 | 7.9 | 9.5 | 8.3 | 8.2 | 8.1 | 8.5 | 11.1 |

TABLE 3

| | Amount (pbw) | | | | | | | | | |
|---|---|---|---|---|---|---|---|---|---|---|
| | Comparative Example | | | | | | | | | |
| | 1 | 2 | 3 | 4 | 5 | 6 | 7 | 8 | 9 | 10 |
| A-1 | 40 | 40 | 40 | 40 | 40 | 40 | 80 | 30 | 40 | 40 |
| B-1 | 60 | 60 | 60 | 60 | 60 | 60 | 20 | 70 | 60 | 60 |
| C-4 | 1,120 | | | | | | | | | |
| C-5 | | 1,085 | | | | | | | | |
| C-6 | | | 1,120 | 1,260 | | | | | | |
| C-7 | | | | | 1,120 | 1,120 | 1,120 | | | |
| | | | | | | | | 1,120 | 1,120 | 1,120 |
| D-1 | 480 | 465 | 480 | 540 | 480 | 480 | 480 | 480 | 480 | 480 |
| E-1 | | | | | | 15 | | 15 | | 15 |
| F-1 | | | | | | | 1 | | | 1 |
| Filler volume (vol %) | 78.5 | 78.0 | 78.5 | 80.5 | 78.5 | 75.5 | 75.3 | 78.5 | 75.5 | 75.3 |
| C/D weight ratio | 7/3 | 7/3 | 7/3 | 7/3 | 7/3 | 7/3 | 7/3 | 7/3 | 6/4 | 9/1 |
| Viscosity (P · s) | un-measurable because it was unable to knead | 694 | 164 | 229 | 332 | 77 | 70 | 212 | 89 | 78 |
| Viscosity (Pa · s) after 200° C./100 h drying | | 791 | un-measurable | un-measurable | un-measurable | un-measurable | un-measurable | un-measurable | un-measurable | un-measurable |
| Thermal conductivity (W/m · K) | | 1.9 | 4.6 | 5.2 | 4.0 | 3.4 | 3.4 | 4.1 | 3.5 | 3.5 |
| Volume resistivity (Ω · cm) | | $3.1 \times 10^{10}$ | $4.1 \times 10^{10}$ | $4.5 \times 10^{10}$ | $2.6 \times 10^{10}$ | $2.1 \times 10^{10}$ | $3.2 \times 10^{10}$ | $1.9 \times 10^{10}$ | $1.5 \times 10^{10}$ | $2.2 \times 10^{10}$ |
| Thickness (μm) | | 13 | 55 | 56 | 31 | 32 | 32 | 28 | 27 | 27 |
| Thermal resistance (mm² · K/W) | | 6.1 | 12.0 | 11.2 | 9.1 | 9.3 | 9.2 | 8.2 | 8.3 | 8.4 |
| Thermal resistance (mm² · K/W) after hot humid holding | | 7.9 | 16.0 | 17.1 | 16.1 | 16.2 | 15.2 | 15.7 | 15.9 | 15.2 |

The invention claimed is:

1. A heat conductive silicone grease composition comprising:
   (A) 5 to 99 parts by weight of an organopolysiloxane represented by the general formula (1):

[Chem. 1]

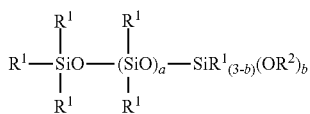

(1)

wherein $R^1$ is each independently a substituted or unsubstituted $C_1$-$C_{18}$ monovalent hydrocarbon group, $R^2$ is each independently an alkyl, alkoxyalkyl, alkenyl or acyl group, a is an integer of 5 to 100, and b is an integer of 1 to 3, and having a kinematic viscosity at 25° C. of 10 to 10,000 mm²/s,
   (B) 1 to 95 parts by weight of an organopolysiloxane represented by the average compositional formula (2):

(2)

wherein $R^3$ is each independently a substituted or unsubstituted $C_1$-$C_{18}$ monovalent hydrocarbon group, and c is a number of 1.8 to 2.2, and having a kinematic viscosity at 25° C. of 10 to 100,000 mm²/s, the total amount of components (A) and (B) being 100 parts by weight,
   (C) a spherical aluminum oxide powder having an average sphericity of at least 0.8, a count of up to 30 surface hydroxyl groups/nm², and an average particle size of 3 to 20 μm, a content of coarse particles with a size of 25 to 45 μm in laser diffraction type particle size distribution being up to 0.2% by weight based on the overall powder (C), and
   (D) a spherical and/or irregular zinc oxide powder having an average particle size of 0.01 μm to less than 3 μm, a content of coarse particles with a size of 25 to 45 μm in laser diffraction type particle size distribution being up to 0.2% by weight based on the overall powder (D),
   components (C) and (D) being blended in a weight ratio of from 5:5 to 9.5:0.5, the total amount of components (C) and (D) being 65 to 83% by volume of the overall composition,
   the composition having a thermal conductivity of 2 W/m·K to less than 5.5 W/m·K as measured by the hot disk method according to ISO 22007-2, and a viscosity at 25° C. of 5 to 800 Pa·s as measured by a spiral viscometer at rotational speed 10 rpm.

2. The heat conductive silicone grease composition of claim 1 which after heat degradation at 200° C. for 100 hours, turns to an uncured grease state having a viscosity at 25° C. of up to 1,000 Pa·s as measured by a spiral viscometer at rotational speed 10 rpm.

3. The heat conductive silicone grease composition of claim 1, further comprising (E) a volatile solvent in which components (A) and (B) are dispersible or dissolvable, in an amount of up to 100 parts by weight per 100 parts by weight of components (A) and (B) combined.

4. The heat conductive silicone grease composition of claim 1, further comprising (F) an alkoxysilane having the general formula (3):

(3)

wherein $R^4$ is each independently a $C_9$-$C_{15}$ alkyl group, $R^5$ is each independently a substituted or unsubstituted $C_1$-$C_8$ monovalent hydrocarbon group, $R^6$ is each independently a $C_1$-$C_6$ alkyl group, d is an integer of 1 to 3, e is an integer of 0 to 2, d+e is an integer of 1 to 3, in an amount of 0.1 to 50 parts by weight per 100 parts by weight of components (A) and (B) combined,
components (C) and (D) being surface treated with component (F).

5. The heat conductive silicone grease composition of claim 1, which after standing in 130° C./85% RH atmosphere for 96 hours, has a thermal resistance at 25° C. of up to 15 mm²·K/W as measured by the laser flash method.

6. The heat conductive silicone grease composition of claim 1, having a volume resistivity of at least $1 \times 10^9$ Ω·cm.

* * * * *